3,256,868
COMBUSTION ENGINE SYSTEM
Jean Louis Gratzmuller, 66 Blvd. Maurice Barres,
Neuilly-sur-Seine, France
Filed May 13, 1964, Ser. No. 367,091
Claims priority, application France, May 16, 1963,
935,000
4 Claims. (Cl. 123—41.44)

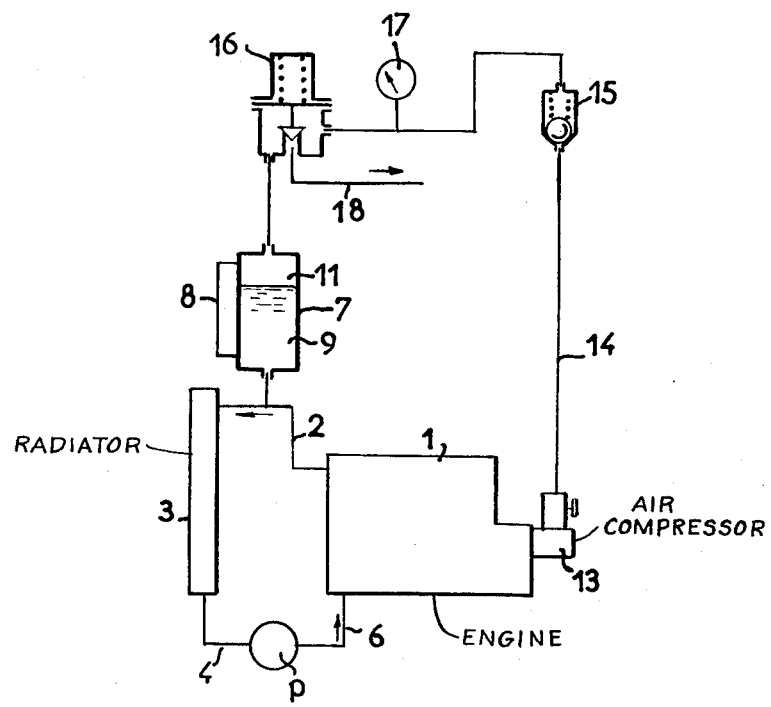

This application is a continuation-in-part of my copending application Serial No. 76,929, filed December 19, 1960 and now U.S. Patent No. 3,162,182.

In an engine system of the general class to which this invention relates, the cooling means comprises a closed-loop circuit for a coolant liquid, usually water, said circuit including therein a portion disposed in heat-exchange relation with the engine, another portion disposed in heat-exchange relation with the atmosphere, together with for maintaining the liquid throughout said closed-loop circuit, at all times during system operation, at a superatmospheric pressuree substantially higher than the maximum vapour tension of the coolant liquid at the temperature attained at the hottest point in the circuit.

Pressure-liquid cooling arrangements of this kind have been constructed and operate with great advantage in the efficiency and over-all economy of the engine system. Objects of the present invention are to provide a closed-loop pressure-liquid cooled engine system of that kind which will, in addition, possess a number of practical advantages especially in that the cooling means shall constitute together with the engine an independent and autonomous unit, and as well as being relatively simple and inexpensive to manufacture.

In accordance with the invention, the closed-circuit cooling means incorporates, as the means for pressurizing the coolant liquid in the circuit, an air compressor mounted adjacent the engine and coupled to be directly driven therefrom and a pressure conduit means connecting the discharge outlet to the compressor with an uppermost point of the cooling circuit. Preferably, the pressure conduit means connects with the top of a feeder tank partly filled with coolant liquid and having a lower outlet discharging into an upper point of the closed-loop cooling circuit. Further, the conduit means preferably includes a check-valve as well as a pressure-vent valve discharging to atmosphere.

The main advantages of the arrangement of the invention include the fact that the compressor casing can be directly or integrally attached to the engine casing in a suitable position to enable direct coupling of the compressor drive shaft with the engine shaft, and so that the engine, engine cooling circuitry and pressurizing means can be constructed as a compact autonomous unit. Air compressors are standard units of equipment capable of being constructed inexpensively in large series and operating very reliably. Thus, standard air compressors of the type widely used as sources of compressed air on board heavy-duty vehicles for supplying the air-brakes and other ancillary pneumatic services of the vehicle are advantageously used as a pressurizing means in the cooling system of the invention.

An exemplary embodiment of the invention will now be described for purposes of illustration but not of limitation with reference to the accompanying drawing, which is a diagrammatic view of the improved engine system.

The reference 1 designates an internal combustion engine such as a diesel engine, shown in outline. The closed-circuit cooling system for the engine is shown as including a conventional radiator 3 having an upper inlet connected by a line 2 with an upper outlet of the water-jacket of the engine 1, and having a lower outlet connected through lines 4-6 to a lower inlet of said water-jacket. A water pump P, e.g. a centrifugal pump driven from the engine, is shown connected in the line 4-6 for circulating the water around said circuit, as indicated by arrows.

A feeder tank 7 mounted above the conduit 2 has a bottom outlet connected with a high point of said conduit, and has a top opening serving as a compressed air inlet as will presently appear. A water-level gage 8 is shown associated with a side of the tank. In operation, the cooling circuit including the engine water jacket, pipe 2, radiator 3, pipe 4, pump P and pipe 6 are adapted to be completely filled with water, which rises in the tank 7 up to an intermediate level therein, as indicated by gauge 8, leaving an air space 11 in the upper part of the tank above the body of water 9. A predetermined superatmospheric pressure is at all times during engine operation maintained in the air space 11 so as to apply a corresponding pressure to the water in the cooling circuit.

According to this invention, the said pressure in the air space 11 is produced by means of an air compressor 13 which is mounted adjacent the engine 1 and is coupled to be directly driven therefrom. The compressor 13 has an inlet, not shown, for atmospheric air, and has a compressed air outlet with which is connected a pressure line 14. The line 14 extends upward as shown and connects with the top opening of feeder tank 7, and has interposed in series therein a non-return check-valve 15 and a pressure-venting valve 16 provided with a biassing spring and a vent conduit 18 discharging to atmosphere. The biassing spring in vent valve 16 is adjusted to a biassing force corresponding to the prescribed pressure of liquid to be maintained in the cooling circuit, e.g. a pressure of 1.25 kg./cm.$^2$ gauge, so as to permit the vent valve to open and discharge excess air to the atmosphere through vent line 18 when the air pressure in conduit 14 exceeds the prescribed value. Preferably, matters are so arranged that during the operation of the engine 1 and compressor 13, there is a permanent leakage of air at a low rate from vent valve 16 and through vent line 18, thereby ensuring that the prescribed pressure is maintained in the system in a positivee manner at the cost of only a trifling loss of engine power.

In the operation of the system described, a short time after the engine 1 has been started up the water pressure in the cooling circuit including radiator 3 becomes established at the prescribed value well before the temperature of the coolant water has reached a valve such that the vapour tension of the water exceeds the said pressure valve. Safe and reliable cooling is thus ensured from the outset.

It will be understood that the invention is susceptible of many forms of embodiment and modifications other than what has been schematically disclosed herein.

What I claim is:
1. A combustion engine system comprising in combination a combustion engine, a liquid cooling system for the engine having a liquid flow circuit arranged in a sealed, closed loop and including a first circuit portion disposed in heat exchange relation with said engine and another circuit portion disposed in heat exchange relation with the atmosphere, a body of coolant liquid completely filling said circuit and means for circulating said liquid around said circuit, a gas compressor mounted adjacent the engine and coupled to be driven therefrom, a pressure line connected to the compressor outlet and connected to a high point of said liquid flow circuit in pressure transmitting relation with the body of liquid therein, and means controlling the gas pressure in said pressure line to impose on said body of liquid a substantially constant gas pressure sufficiently high to prevent the formation of steam within said circuit.

2. A combustion engine system comprising in combination a combustion engine, a liquid cooling system for the engine having a liquid flow circuit arranged in a closed loop and including a circuit portion in heat exchange relation with said engine and another, heat-dissipating circuit portion spaced from said first portion, a feeder tank mounted above said circuit and having a lower outlet connected with a high point of said circuit and having a top opening, a body of coolant liquid completely filling said circuit and a lower portion of said tank, means for circulating said liquid around said circuit, a gas compressor drivably coupled to said engine, a pressure line connected to the compressor outlet and connected to said top opening of the feeder tank, and means connected in said pressure line to maintain the gas pressure exerted by said compressor on said body of liquid at a substantially constant pressure sufficiently high to avoid formation of steam within said circuit, said means connected in said pressure line including a vent valve biased to vent pressure in excess of said substantially constant pressure to the atmosphere and a check valve positioned between said vent valve and said compressor to prevent flow of compressed gas from said circuit to said compressor.

3. A combustion engine system comprising, in combination, a combustion engine, a liquid cooling system for the engine including a liquid flow circuit arranged in a closed loop in heat exchanging relationship with said combustion engine, said liquid flow circuit including a radiator therein, a body of cooling fluid within said liquid flow circuit, pump means within said liquid flow circuit for circulating said cooling fluid therewithin, a gas compressor coupled to said combustion engine to be driven thereby, pressure line means interconnecting the outlet of said gas compressor with a high point of said liquid flow circuit to thereby permit gas from said compressor to be superimposed in pressure transmitting relation upon said body of cooling fluid; and means connected in said pressure line means to maintain the gas pressure upon said body of liquid substantially constant at a pressure high enough to prevent the formation of steam within said liquid flow circuit, said means including a spring-biased valve which in one position communicates said gas pressure with the atmosphere to vent pressure in excess of said substantially constant pressure and in another position prevents said gas pressure from communicating with the atmosphere.

4. In a combustion engine system having a combustion engine, a gas compressor coupled to said engine and drivable thereby, a closed loop liquid cooling circuit in heat exchanging relation with said engine and a body of liquid within said circuit, that method comprising the steps of:
operating said engine to thereby operate said gas compressor to produce a pressurized gas supply;
applying said pressurized gas supply to said body of liquid in said closed loop liquid cooling circuit;
maintaining said pressurized gas supply at a substantially constant pressure sufficiently high to prevent said body of liquid from forming steam within said liquid cooling circuit; and,
venting gas pressure in excess of said substantially constant pressure to the atmosphere to thereby assure that said gas pressure on said liquid will remain substantially constant.

References Cited by the Examiner

UNITED STATES PATENTS

| 1,565,284 | 12/1925 | Mallory | 123—41.02 |
| 1,694,071 | 12/1928 | Mallory | 123—41.02 |
| 3,171,392 | 3/1965 | Alfieri | 123—41.01 |

FOREIGN PATENTS

| 1,097,151 | 2/1955 | France. |
| 1,194,363 | 5/1959 | France. |

KARL J. ALBRECHT, *Primary Examiner.*